United States Patent [19]
Smith

[11] 3,980,743
[45] Sept. 14, 1976

[54] METHOD OF TIRE CURE CONTROL
[75] Inventor: Thomas W. Smith, Akron, Ohio
[73] Assignee: McNeil Corporation, Akron, Ohio
[22] Filed: Oct. 3, 1973
[21] Appl. No.: 403,118

Related U.S. Application Data
[62] Division of Ser. No. 137,427, April 26, 1971.

[52] U.S. Cl. .................. 264/40.2; 73/15 R; 264/236; 264/326; 425/29
[51] Int. Cl.² .......................................... B29H 5/02
[58] Field of Search ............. 264/40, 315, 326, 236, 264/347; 73/15 R; 425/29, 143, 144, 162

[56] References Cited
UNITED STATES PATENTS

| | | | |
|---|---|---|---|
| 3,102,425 | 9/1963 | Westman et al. | 73/362 SC |
| 3,339,227 | 9/1967 | Ehrenfreund | 425/144 |
| 3,443,280 | 5/1969 | Hugger | 264/40 X |
| 3,659,974 | 5/1972 | Neugroschl | 264/40 X |
| 3,718,721 | 2/1973 | Gould et al. | 264/40 |

Primary Examiner—Jan H. Silbaugh
Attorney, Agent, or Firm—Hamilton, Renner & Kenner

[57] ABSTRACT

A system for controlling sequence and duration of the operational steps in processes such as vulcanization of a pneumatic tire is capable of operating under two basic modes or parameters. In one mode the operational steps are dictated by elapsed real time, while in the other mode, the operation can be dictated by elapsed cure equivalent factors. The desired length of each step or the cure, whether in time or cure equivalents, is set into an input program means. In the time mode, time generating circuitry provides an output proportional to elapsed time which output is displayed on a counter and electrically compared with the information in the input program means. When a match occurs, the time generating circuitry and displays are reset and the input program means directs the tire vulcanization press to perform the next sequential function. Also disclosed is circuitry which is capable of performing secondary functions such as extending the length of a step, as necessary. If it is desired to operate in the cure equivalent mode, a signal proportional to elapsed cure equivalents is developed by a cure equivalent generating circuitry which performs digital integration of the Arrhenius function. The input to cure equivalent generating circuitry can be a signal proportional to tire temperature developed by internal thermocouples or can be a signal which is directly proportional to the Arrhenius function as generated by a thermistor sensor.

7 Claims, 9 Drawing Figures

METHOD OF TIRE CURE CONTROL

This is a division of application Ser. No. 137,427, filed Apr. 26, 1971.

BACKGROUND OF THE INVENTION

This invention relates to the controlling of the operational steps of processes such as tire vulcanization by use of an input program means. More specifically, this invention relates to a method which totally controls the vulcanizing process either in terms of steps having a time duration or in terms of steps having a duration proportional to cure equivalents.

Many industries utilize machinery which performs sequential steps of varying lengths on a workpiece. The vulcanization of a tire in a tire curing press, for example, is such a process having numerous steps of varying duration. Precise control of these steps is quite important not only to the quality of the finished product but also for the efficient use of the particular machinery. While varying degrees of sophistication exist in devices to control the various operations as a function of time, certain deficiencies nevertheless exist in all controls.

For example, many prior art devices which utilize a "program" type of input require a great deal of manual "set up" on the part of an operator. One such device utilizes mechanical stepping switches which must be set at the desired location along a shaft or the like so that they are tripped at the desired time. Even those devices which utilize a card type input are cumbersome in that special cards designed for the specific use are employed rather than the more standard data entry means available.

Because the tire vulcanization process, like other manufacturing processes, is made up of sequential steps having significantly variable lengths, the program devices of the prior art all are forced to provide capabilities for each step dependent on the longest step to be encountered. This practice, of course, proves to be quite wasteful in that much program space and the attendant electronic circuitry is not at all necessary for the majority of the operating cycle.

Other supposedly automatic control systems utilize complex mechanical or electromechanical devices which are expensive to manufacture and not always reliably accurate. Many attempts at providing a total electronic system have utilized analog circuitry which does not provide a satisfactory degree of accuracy.

Further, present systems utilized for controlling the process of tire vulcanization are capable of satisfactory operation only in a time mode. The rubber industry has developed a standard known as a "cure equivalent" which may be defined as one minute of curing time at a constant reference temperature, typically about 300°F. Thus, it may be desirable for a particular tire compound to be cured for twenty cure equivalents, which, in the long run, is a much more accurate parameter than pure time duration because the actual temperature of the rubber is being monitored.

Certain prior art work has been done in the area of analog calculation of cure equivalents for various purposes, but no presently marketable device utilizes such calculations to control stepped press operations. One problem in calculating the cure equivalent factor based on the Arrhenius function involves the necessary means of obtaining true temperatures internally of the tire, these temperatures being used as inputs to the cure equivalent calculation circuitry. While such has been done experimentally through the use of thermocouples embedded in the tire, no system has been devised which will monitor and operate the standard "twin" vulcanizing press. In this press, two tires are cured at one time. This is no problem for those prior art devices which control press operations as a fuction of time, but has apparently been a problem which has prevented prior art devices from utilizing cure equivalents as a control standard since one tire in a "twin" press may be curing faster than the other tire. No device has been developed which will satisfactorily account for the possible variances between the temperatures of two tires within a twin press.

Further, by using thermocouples to read the temperature, it is necessary to provide sometimes complex electronic circuitry which will convert the temperature signals to one which is proportional to the Arrhenius function. Despite this problem, no satisfactory substitute for the thermocouple input has been proposed.

SUMMARY OF THE INVENTION

It is, therefore, a primary object of the present invention to provide a method which automatically controls the sequential steps of a manufacturing process such as the vulcanization of tires.

It is another object of the present invention to provide a method as above, which is capable of operation in multiple modes, such as a time mode and a cure equivalent mode or the like.

It is yet another object of the present invention to provide a method, as above, which utilizes a standard input program device that requires a minimum of manual set-up procedures.

It is still another object of the present invention to provide a method, as above, which operates with digital components and is therefore highly accurate.

It is a further object of the present invention to provide a method, as above, which is designed to accommodate the shorter steps of the manufacturing process and which has secondary circuitry available to satisy the demands of the more lengthly steps.

It is a still further object of the present invention to provide a method, as above, which is capable of operating in the cure equivalent mode on a twin tire press.

It is another object of the present invention, as above, to provide unique means of monitoring internal tire conditions for purposes of providing an output signal proportional to the Arrhenius function.

These and other objects of the present invention which will become apparent from the following description are accomplished by improvements hereinafter described and claimed.

In general, an apparatus for controlling the operational steps in a process such as the vulcanization of a tire is controlled by a program entered into a standard tabulating card or the like. This program controls the output functions as well as specifying the length of each step in terms of time, or in terms of some other parameter, such as cure equivalents, if that alternative mode is selected. In the time mode, time generating circuitry operates electromechanical stepping switches which provide a coded signal to a digital comparator and a visual time readout. This coded signal, representative of elapsed time is compared with the desired time for the particular step recorded in the program device. When a match occurs, the next combination of output functions is directed and the time generator and other devices are reset to begin the count anew.

Since the particular input program chosen allows a maximum of 9.9 minutes for each step, if any step is to be of a longer duration, the input program activates step extend circuitry which will add on to the time of the desired step. Other specific features dictated by the process of vulcanizing tires, the preferred embodiment, are also disclosed.

For example, in the mode upon which the termination of a step is to be dictated by elapsed cure equivalents, a cure equivalent generator supplements the time generator previously described. This generator receives a signal proportional to the temperature internally of the tire and operates thereon to produce the exponental Arrhenius function which is then digitally integrated to produce the cure equivalents. In an alternative embodiment, the generator receives a signal proportional to the Arrhenius Function from a thermistor sensor.

DESCRIPTION OF A PREFERRED EMBODIMENT

Figure 1:
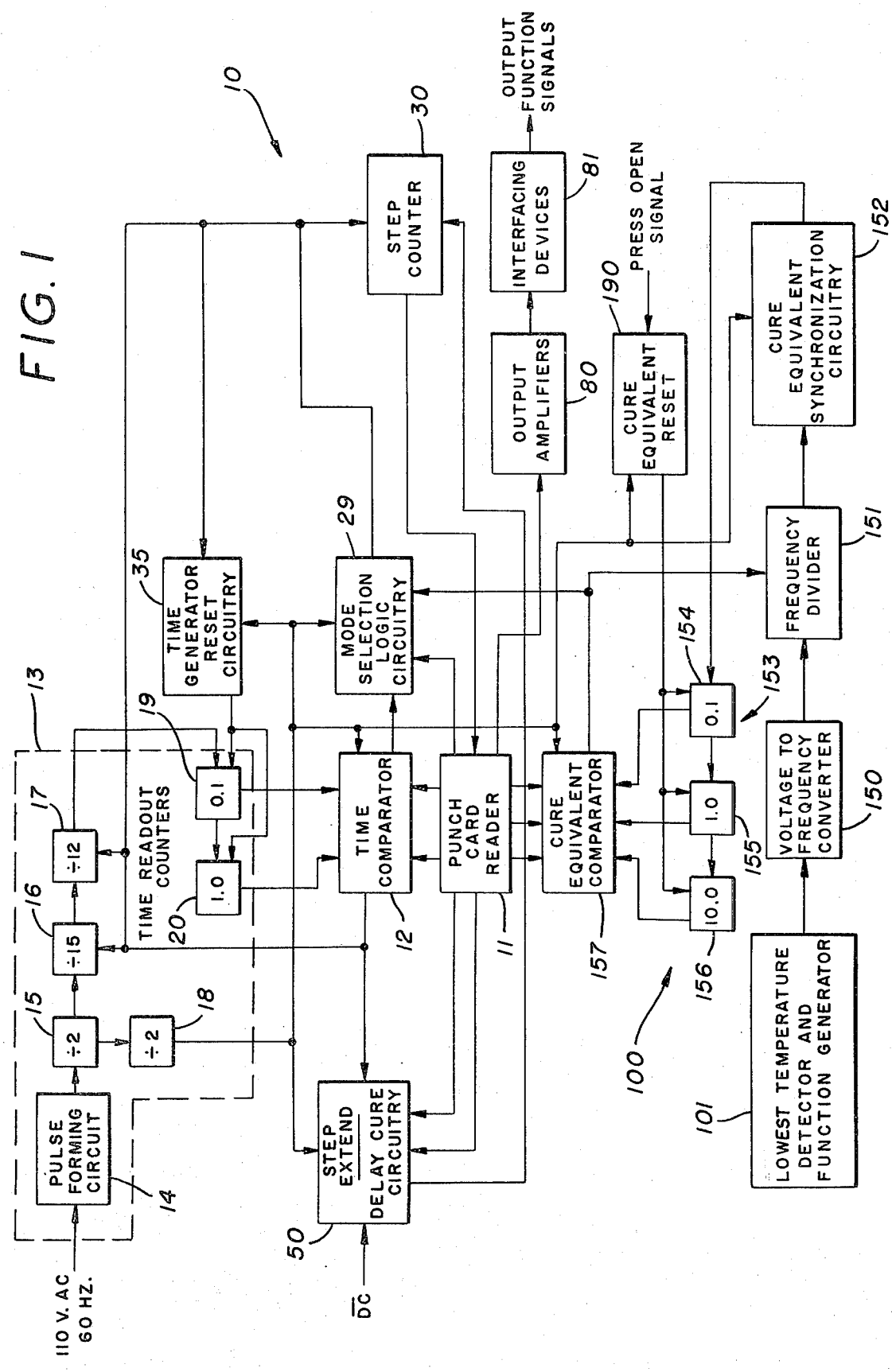
FIG. 1 is a basic block-schematic diagram of the tire cure programmer according to the concept of the present invention.

An apparatus which is capable of controlling the sequential steps of a manufacturing process, such as the vulcanization of a pneumatic tire, is indicated generally by the numeral 10 in FIG. 1. Although the apparatus is described as used for the vulcanization of tires and is thus a tire cure programmer, it is evident that its general principals have applicability to other manufacturing processes. In the environment shown, the tire cure programmer 10 is capable of operation in multiple modes - the length of the steps being measured either by elapsed time, by elapsed cure equivalents or by various combinations of the two. An input program means is deciphered by a punch card reader 11 which is a conventional diode matrix decoding device such as that manufactured by Hickok Electrical Instrument Co., Cleveland, Ohio. The particular punch card reader 11 shown herein is one which is capable of receiving information from an input program means. Such information may, for example, be punched on an abbreviated (twenty-two columns instead of eighty columns) standard data entry or tabulation card as manufactured by International Business Machine Corp. (IBM), New York, N.Y.

Figure 2:
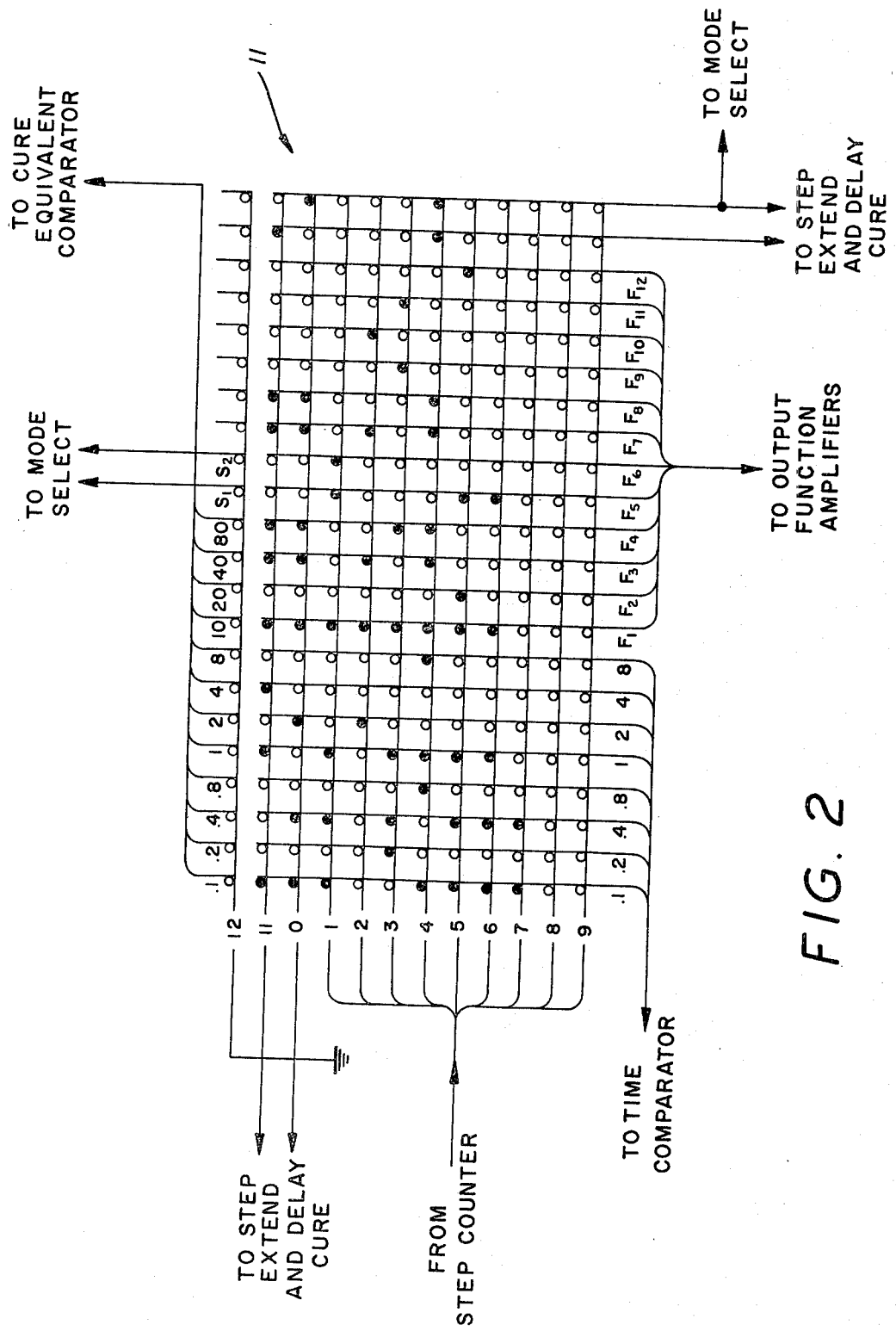
FIG. 2 is a diagrammatic representation of a typical input program means according to the concept of the present invention.

The card and reader combination is shown somewhat schematically in FIG. 2 as having twelve rows and twenty-two columns thus providing 264 bit read-only memory capability. While the exact manner of entering data into such a card is not important to this invention, the particular method selected will now be described in detail. The row numbered 1–9, inclusive, are utilized as time commands for the various steps in the tire vulcanization or curing process; rows "0" and "11", standard IBM card terminology, are utilized as time commands for step extend and delay circuitry 50, and row "12", again standard IBM card terminology, is utilized when the cure programmer 10 is in a cure equivalent mode; all to be hereinafter described.

The first eight columns of rows 1–9, inclusive, and rows 0 and 11 are reserved for two decades of standard 1–2–4–8 binary coded decimal (BCD) information which consists of the amount of time dictated for a specific step in the curing process. The next twelve columns of these rows are utilized to command certain output functions in the tire vulcanizing sequence. The last two columns are for ordering the special functions embodied in the step extend and delay cure circuitry 50, as well as the cure equivalent mode.

The first twelve bits of information on row 12 are used for three decades of standard 1–2–4–8 BCD code representative of cure equivalent count. The next two bits also are reserved to provide signals relating to the cure equivalent mode to be hereinafter described.

When in the time mode, that is, in the mode under which the curing steps are measured and controlled by a real time factor, the command information punched in the first eight rows is supplied to a standard sixteen bit digital time comparator 12. This command signal is compared with an eight bit time elapsed signal from a time generator system 13 shown in FIG. 1.

A conventional 110 volt AC, 60 cycle per second power source is provided to a pulse forming circuit 14 of time generator 13. The pulse forming circuit 14 includes such items as a zener diode and a dropping resistor in a standard configuration which clip the input voltage at a certain point, for example, 15 volts, forming an approximate square wave. This signal is then fed to a Schmitt trigger within circuit 14 to precisely square the wave for presentation to the flip flops of a conventional ripple counter frequency divider system consisting of a division-by-two bank 15, a division-by-fifteen bank 16, and a division-by-twelve bank 17. The output of bank 17 is thus a pulse having a frequency of once every 6 seconds, the 60 cycle pulse having been divided by 360. The division factors of two, fifteen and twelve were chosen as merely a convenient manner of obtaining the desired pulse, it being understood that any manner of achieving the ultimate division factor of 360 would be acceptable.

Another frequency divider system 18 receives the 30 cycle signal from the division-by-two bank 15 and performs a further division-by-two function thus giving a 15 cycle per second pulse output. This signal has certain uses in the circuitry to be hereinafter described.

Figure 3:
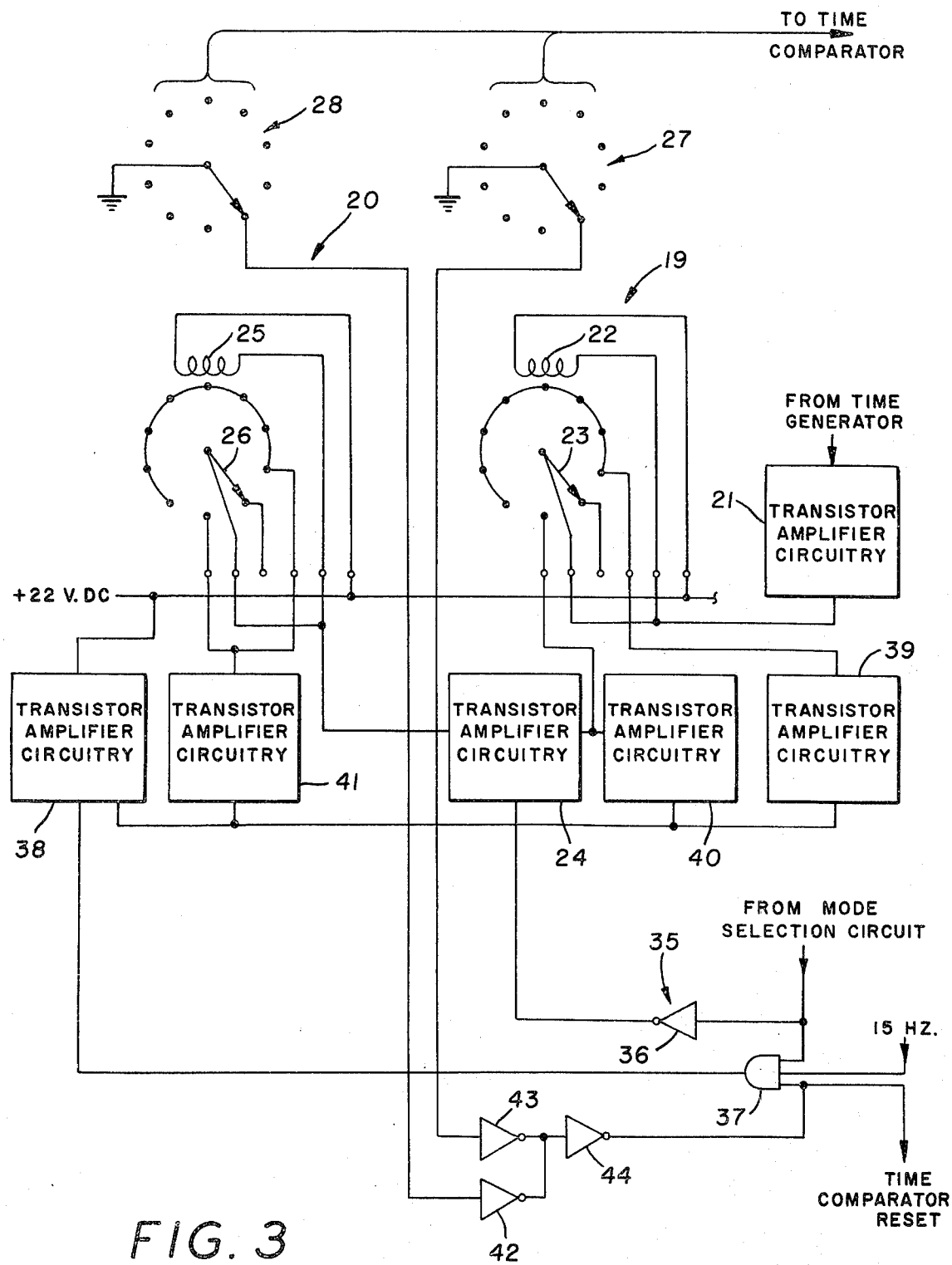
FIG. 3 is a block-schematic diagram of a portion of the circuitry shown in FIG. 1, particularly the time readout counters and time generator reset circuitry.

The pulses every six seconds (1/10 of a minute) are suitably amplified and used to drive the time readout counters 19 and 20. These counters are best shown in FIG. 3 as electromechanical stepping switches which afford visual decimal readout of the time in minutes (counter 20) and tenths of minutes (counter 19) and which also generate the eight bit BCD coded electrical readout to the time comparator 12, the latter being the ultimate output of the time generator 13. The counters 19 and 20 are conventional items as manufactured under U.S. Pat. No. 3,238,359 by Durant Digital Instruments, Milwaukee, Wis. Use of such electromechanical means of time readout, of course, affords a non-volatile memory in the event of unanticipated power failure or the like.

Since the coils of these particular counters 19 and 20 should not be subjected to a pulse of any substantial duration, in the preferred embodiment the signal from bank 17 of the frequency divider system can be shortened in duration as by a one-shot multivibrator or gate logic circuitry, as desired and as would be evident to one skilled in the art. In actual practice, it has been found that a pulse every six seconds having a duration of from 10 to 20 milliseconds is practical as a signal to be supplied to the counters 19 and 20.

Counters 19 and 20 are shown in somewhat more detail in FIG. 3. The short pulse every six seconds from time generator 13 turns on transistor amplifier circuitry 21 which successively energizes and de-energizes the stepping coil 22 of the tenth minute decade counter 19 causing the indicator 23 to advance one step. Transistor amplifier circuitry 21 includes a transistor as well as other associated components such as resistors, diodes and the like, as may be necessary and as would be evident to one having ordinary skill in the art. When the indicator 23 reaches the ninth step (nine tenths of a minute), the next pulse to transistor circuitry 21 completes the circuit to the tenth minute decade counter 19, as before, and also completes the circuit through transistor amplifier circuitry 24 to energize the stepping coil 25 of the unit's counter 20 causing its indicator 26 to advance one step. As this stepping action continues, the BCD coded numbers are transmitted from the upper decks 27 and 28 of counters 19 and 20, respectively, to the time comparator 12.

Figure 9:
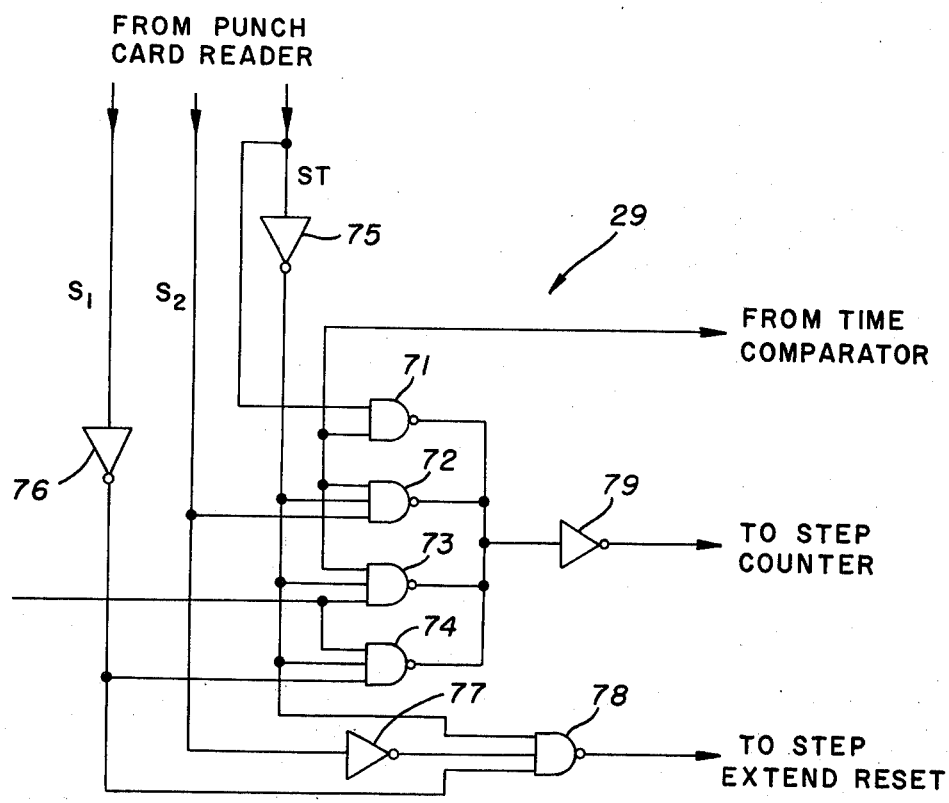
FIG. 9 is a schematic diagram of a typical mode selection logic circuit shown in block form in FIG. 1.

Thus, the output of the time generator circuitry 13, representative of elapsed time, is presented in BCD form from counter 19 and 20 to the digital time comparator 12 to be compared with the programmed time as punched in the first eight columns of the row in the punch card representative of the particular step being timed, as previously described. For example, the darkened-in circles in the card FIG. 2 represent punched holes in the card. When step 1 is being timed in the example shown, the desired time of 1.5 minutes is punched in row "1". When the actual time generated by circuitry 13 equals 1.5 minutes, the comparator 12 recognizes the match and delivers a latched output signal to mode selection logic circuitry 29 which can be a system of logic elements, such as AND gates and the like, as would be evident to one skilled in the art to be hereinafter described. If the time mode alone has been selected, a signal (ST in FIG. 9) from the twenty-second column of the punch card (see FIG. 2) combines with the signal from comparator 12 to deliver a signal which will perform four general functions.

First, the signal imposes a ground on the reset terminal of the standard flip flops in banks 16 and 17 of the frequency division system which, of course, momentarily stops the clock pulse output of the time generator 13 and effectively resets the frequency divider.

Figure 4:
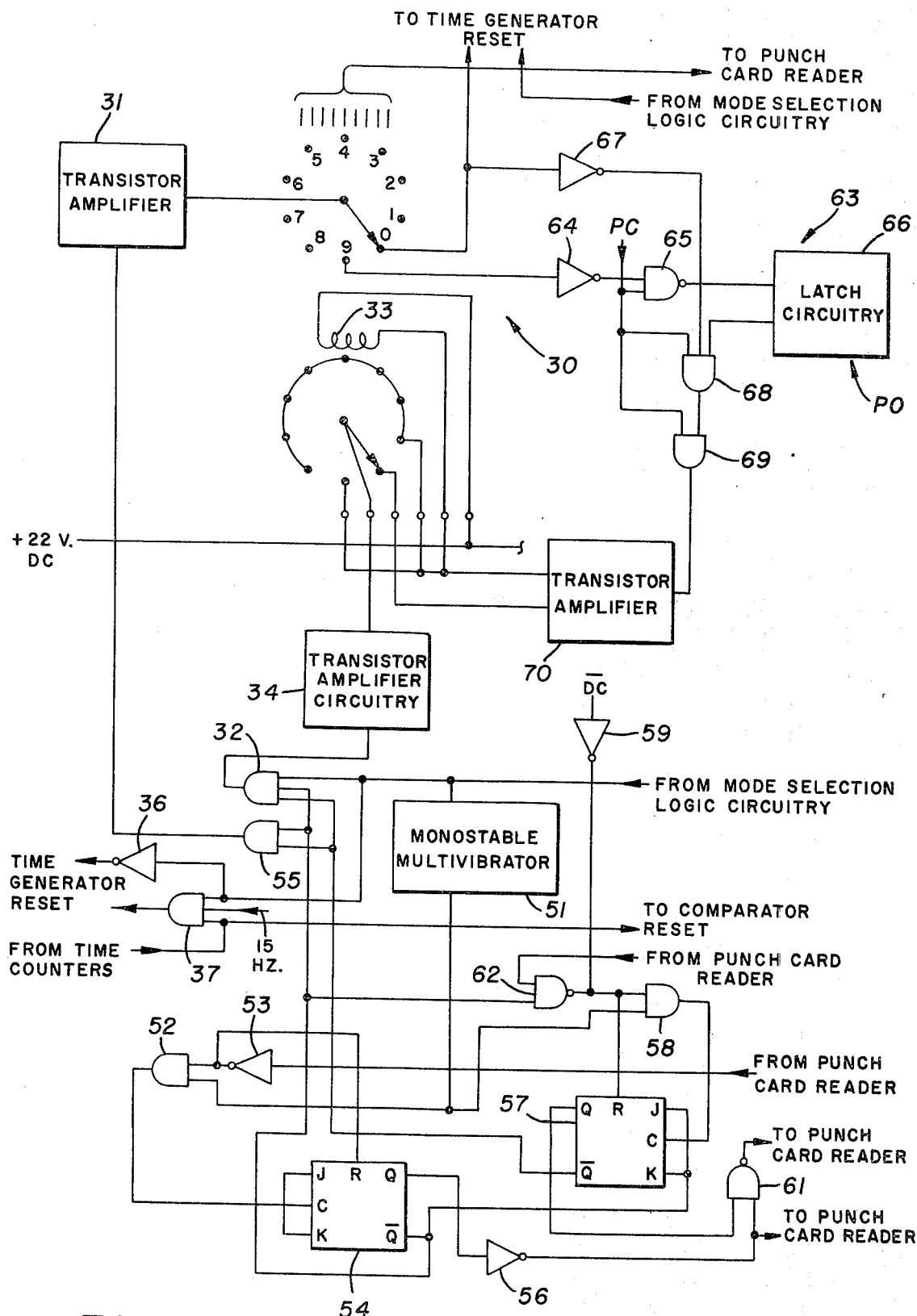
FIG. 4 is a block-schematic diagram of a portion of the circuitry shown in FIG. 1, depicting the step counter, and the step extend, delay cure and open press circuits.

Second, an output signal from mode selection circuitry 29 energizes a step counter 30 which is similar to counters 19 and 20. Step counter 30 is an electromechanical stepping switch which affords a visual readout of which step is currently being accomplished in the tire curing process. Counter 30, however, affords a decimal electrical readout, as opposed to the BCD readout of counters 19 and 20, to the punch card reader 11. This signal transfers the ground of the "read signal" on the particular row of the punch card that represents the step just finished (step 1 in the example) to the next step in the tire curing sequence. This ground is maintained by transistor amplifier 31. As shown in FIG. 4 and as will be hereinafter described in more detail, the transfer of grounds is accomplished because the signal from the mode selector 29 completes the input to an AND gate 32 to ultimately energize the coil 33 of counter 30 through the activation of transistor amplifier circuitry 34.

A third function of the output of mode section circuitry 29 upon receiving the signal from comparator 12 is to activate the time generator reset circuitry 35 shown in block form in FIG. 1 and in detail in FIG. 3. The signal from the mode selection circuitry 29 passes through digital invertor 36 and de-energizes transistor circuitry 24 by grounding the base circuit thereto. This signal also completes the inputs to a three input AND gate 37 allowing the 15 cycle per second pulse from frequency divider bank 18, previously described, to trigger the base of transistor amplifier circuitry 38. Transistor 38 drives transistor amplifiers 39, 40 and 41 at the 15 cycle reset rate. Since transistor 24 has been de-energized, the indicators 23 and 26 of counters 19 and 20, respectively, step toward zero independently until the zero position is reached.

The indicators 23 and 26 of both the upper decks 27 and 28 and the lower decks of counters 19 and 20 are shown in the zero position in FIG. 3. At this time a ground or low logic signal is fed to two OR connected inverters 42 and 43 and this signal is inverted again by digital inverter 44 and fed to AND gate 37 to inhibit its output. The signal from inverter 44 also resets the latch on time comparator 12, thus removing the signal from the mode selection logic circuitry 29. When the latch is removed from the comparator 12, the coil 33 of step counter 30 is de-energized and the counter thereby advanced placing the ground on the next step in the tire curing sequence.

This process continues step by step and in the example program card shown in FIG. 2, step 2 has a duration of two minutes, step 3 a duration of 1.6 minutes and step 4 a duration of 9.9 minutes. However, in the example shown, it is necessary that step 4 of the curing process be longer than 9.9 minutes. Since due to the particular make-up of the punch card reader 11 and the program punching system in the IBM card, selected, the maximum time in any one step is limited to 9.9 minutes. While one skilled in the art could expand the programming method to include longer steps, such would take a larger and more detailed IBM card as well as additional electronic circuitry. Since there is usually only one long step in the passenger tire curing process, providing the additional time capabilities for all steps would not be economically feasible. This, of course, was described as a problem of the prior art. Disclosed herein is a manner in which to obtain an extension of only those steps in which extra time is needed, this being part of the step extension and delay cure circuitry 50 shown in block form in FIG. 1 and in detail in FIG. 4.

The fourth and final function of the output of comparator 12, through mode selection circuitry 29 upon detecting a match in time (in this instance, step 4, a match of 9.9 minutes) is to activate the step extension and delay cure circuitry 50. While momentarily energizing transistor 34 in preparation for stepping to step 5, this signal also triggers a monostable multivibrator 51 which, in the preferred embodiment, delivers a ten micro-second pulse as one input to an AND gate 52. A second input to AND gate 52 is the ground or low logic signal derived from the punched hole in row "11" column twenty-one of the input program means. While the multivibrator 51 is activated at the end of each step, it is only when the input program means is so punched that the step extend feature of circuitry 50 is activated. Thus, a digital inverter 53 takes the low logic signal and converts it to a high signal to complete the input to AND gate 52. The 10 micro-second pulse from multivibrator 51 is therefore imposed onto the clock circuit of conventional JK step extend flip flop 54. Of course, as is standard in flip flop design, until this time, the flip flop 54 had been inactive and its Q output at a low logic level with the $\bar{Q}$ output at a high level. It is thus the $\bar{Q}$ output which forms one of the inputs to AND gate 32 previously described.

The signal from inverter 53 also drives the reset of flip flop 54 to a high level thus allowing the clock pulse to change the state of the Q and $\bar{Q}$ outputs. With the $\bar{Q}$ output now being down, the signal from AND gate 32 is inhibited turning off transistor 34 preventing the step counter 30 from moving to the next step, in this case step 5. The $\bar{Q}$ output also controls, through AND gate 55, the transistor amplifier 31 such that when flip flop 54 is activated and the $\bar{Q}$ signal lowered, transistor amplifier 31 is turned off removing the ground from step 4. At this time, the Q output which is high will, after being inverted by digital inverter 56, place a ground on row "11".

The parameters of the system can be set such that the transfer of the read signal from row "4" to row "11" occurs quite quickly within a few hundred nanoseconds after the occurrence of the signal from the mode section logic circuitry 29. Resetting of the time generator 13 through reset circuitry 35 then proceeds in a normal fashion as described above, except that the step counter 30 does not advance to the next step (step 5) as the counters 19 and 20 reach zero.

At this stage the time generator 13 begins its count again presenting its output to comparator 12 in a normal fashion. When a match occurs, (5.1 minutes in the example shown in FIG. 2), the normal four functions of the output of the comparator 12 through mode selection circuitry 29 occur. If no "delay cure" is called for, the step counter will advance to read the next step. However, if, as in the example of FIG. 2, a "delay cure" is provided in the same step as the step extend, the following will occur.

Initially, a "delay cure" function is needed if for some reason the tire curing press has remained open for too long a time period between cures such that it has become too cool. If such is the case, the initial portions of the cure are effected at too low a temperature and an adequate cure is not obtained. A timing device (not shown) clocks the amount of time that the press is open, usually no more than a minute for regular passenger size tires. If a certain preset amount of time is exceeded, that amount of time being sufficient for the curing mold to have cooled, a "$\overline{DC}$" signal shown in FIG. 4, is provided to the delay cure portion of circuitry 50. Since it is quite often the case that the tire cure engineer will desire any delay cure to be performed during the longest step (having the step extension feature just described), the example step 4 has both of the features.

The original pulse from multivibrator 51 which triggered the step extend flip flop 54 was also provided to the clock circuit of a delay cure flip flop 57 through AND gate 58. The other input to the AND gate 58 is the low logic $\overline{DC}$ signal (generated as hereinabove described) which is inverted by digital inverter 59. If these conditions are met, the Q output of flip flop 57 goes up and the $\bar{Q}$ output goes to a low logic level.

At the end of the 5.1 minute step extension, the ten micro-second pulse from multivibrator 51 restores the step extend flip flop 54 to its original condition with the Q output going to a low logic level, thereby removing the ground from step "11." Since the JK inputs of delay cure flip flop 57 have been held at a low logic level by the $\bar{Q}$ output of flip flop 54, the delay cure flip flop 57 will not respond to this pulse of the multivibrator 51.

The low Q output of the step extend flip flop 54 having been inverted by digital inverter 56, is fed to NAND gate 61 along with the high signal from the Q output of delay cure flip flop 57 to place a ground or low logic signal on row "O" of the input program means. The low signal from the $\bar{Q}$ output of flip flop 57 still prevents transistor 31 from turning on, thus interrupting the normal read signal. The hole punched in the last column of row "O" in the punch card of FIG. 2 maintains a high logic level on the reset terminal of flip flop 57 through a NAND gate 62 whose other input is the $\bar{Q}$ output of flip flop 54. With the delay cure flip flop 57 now in control the time generator reset circuitry 35 again performs its function and the time generator 13 proceeds to count time until a match with that punched in row "O" (2.5 minutes) is detected by comparator 12.

Again the four functions of the output signal of the mode selection circuitry 29 are performed including the pulse from the multivibrator 51. However, since no hole is punched in the twentyfirst column of row "O" of the punch card, the reset input of step extend flip flop 54 remains at a low level, thus preventing it from responding. However, since the ground still exists in column twenty-two of row "O", the reset input of the delay cure flip flop 57 is at a high logic level and the delay cure flip flop 57 will respond by returning to its original state. With both flip flop 54 and 57 in their original state, all the inputs to AND gate 32 are at a high level and transistor amplifier 34 is energized charging coil 33 of counter 30.

When the time generator reset is complete, the circuit to coil 33 is broken, as previously described, and because transistor amplifier circuitry 31 has also been re-energized, the step counter 30 upon advancing to the next step restores the normal read signal to step 5.

Of course, it should be evident that whenever a match occurs in any step, the multivibrator 51 is activated. However, in the case of the step extend feature, it is only when a ground appears on the twenty-first column of a particular step that the flip flop 54 is activated. In the case of the delay cure feature, it is only when a ground appears on the twenty-second column of a particular step and when a "$\overline{DC}$" signal is provided by the press itself that the flip flop 57 is activated. It should also be evident that the step extend and delay cure features can occur singly or different steps or can occur, as was described, in the same step.

In order to further conserve on the size of the punch card and reader 11, an open press circuitry indicated generally by the numeral 63 in FIG. 4 is provided. Circuitry 63 essentially performs the last step of the tire vulcanizing press, instead of allowing the last step to be dictated by the input program means. Thus, the nine step capacity of the punch card and reader combination 11 can be devoted to other steps in the process.

It is evident that when the step counter 30 moves from step "9" to step "0", the press is ready to be opened. Thus, the step "0" position of counter 30 can be utilized to generate a press open function signal. However, the step counter 30 will be at its zero position at two points during the curing cycle, that is, just after the press closes at the beginning of the cure and at the end of the cure when step 9 has been completed. The open press circuitry 63 is a combination of logic elements designed to recognize and distinguish between the two situations.

When the step counter 30 is on step nine, a low logic signal is fed to an inverter 64. When the press is closed, a press closed PC signal is fed, along with the signal from inverter 64, to a NAND gate 65. Thus, when counter 30 is on step 9 and the press closed, a conventional latching circuit 66 is triggered. As the step counter moves to the zero position, a low logic signal is provided to an inverter 67 and then fed to a three input AND gate 68, the other two inputs being the latched-in signal from circuit 66 and the press closed or PC signal. This signal then directs the opening of the press in a manner similar to that which the other output functions are directed to be hereinafter described. The signal is eventually reset by a press open PO signal.

The signal from AND gate 68 is further combined with the press closed signal at an AND gate 69 with its output operating transistor amplifier 70. It is transistor 70 which energized the coil 33 of counter 30 to move the counter from the zero step. Transistor 70 is therefore inhibited on the opening of the press and activated just after press closing.

In discussing the apparatus heretofore described, operation in the time mode has been assumed. If desired, however, the termination of a step or in effect the cure may be dictated by a factor other than time, such as by a factor known in the rubber industry as the cure equivalent, briefly described above. If such a mode is desired, or if a combination of a time mode and/or cure equivalent mode is desired, the thirteenth and fourteenth columns of row twelve of the punch card are reserved for directing that function through the mode selection logic circuitry 29, in a manner to be hereinafter described.

It is well known that the ratio of two chemical reaction rates is governed by the Arrhenius expression which is used as a standard for all chemical reactions including the vulcanization of rubber. The Arrhenius expression can be defined as $$\frac{R_1}{R_0} = e^{\alpha(\frac{1}{T_0} - \frac{1}{T_1})} \quad (1)$$

where in terms of curing rubber $R_1$ equals the cure rate at absolute temperature $T_1$, $R_0$ equals a cure rate at absolute temperature $T_0$; and $\alpha$ is a constant equal to the activation energy of the rubber compound divided by the universal gas constant. For most vulcanization reactions $\alpha$ is between 10,000° and 14,000° K.

If $R_0$ is defined as the amount of cure which takes place in 1 minute at 300°F, then $T_0$ equals 300°F or about 422°K, $R_0$, defined as such, is exactly one cure equivalent per minute. Equation (1) then becomes $$R_1 = e^{\alpha(\frac{1}{T_0} - \frac{1}{T_1})} \quad \frac{\text{cure equivalents}}{\text{Minute}} \quad (2)$$

with the only variable being $T_1$. Thus, if integration is performed with respect to time, a cure equivalent quantity, defining the state of cure, is determined.

Often times in the rubber industry, as well as others, in performing calculations involving equation (2), a simplifying approximation is used on the assumption that the departure of the rubber temperature $T_1$ from the reference temperature $T_0$ is small relative to the magnitude of the reference temperature. This approximation leads to the following expression for cure rate:

$$R_1 = e^{\frac{\alpha}{T_0^2}(T_1 - T_0)} \quad (3)$$

Circuitry will hereinafter be described in detail which performs calculations both as to the approximation, equation (3) and as to the exact equation (2).

Figure 6:
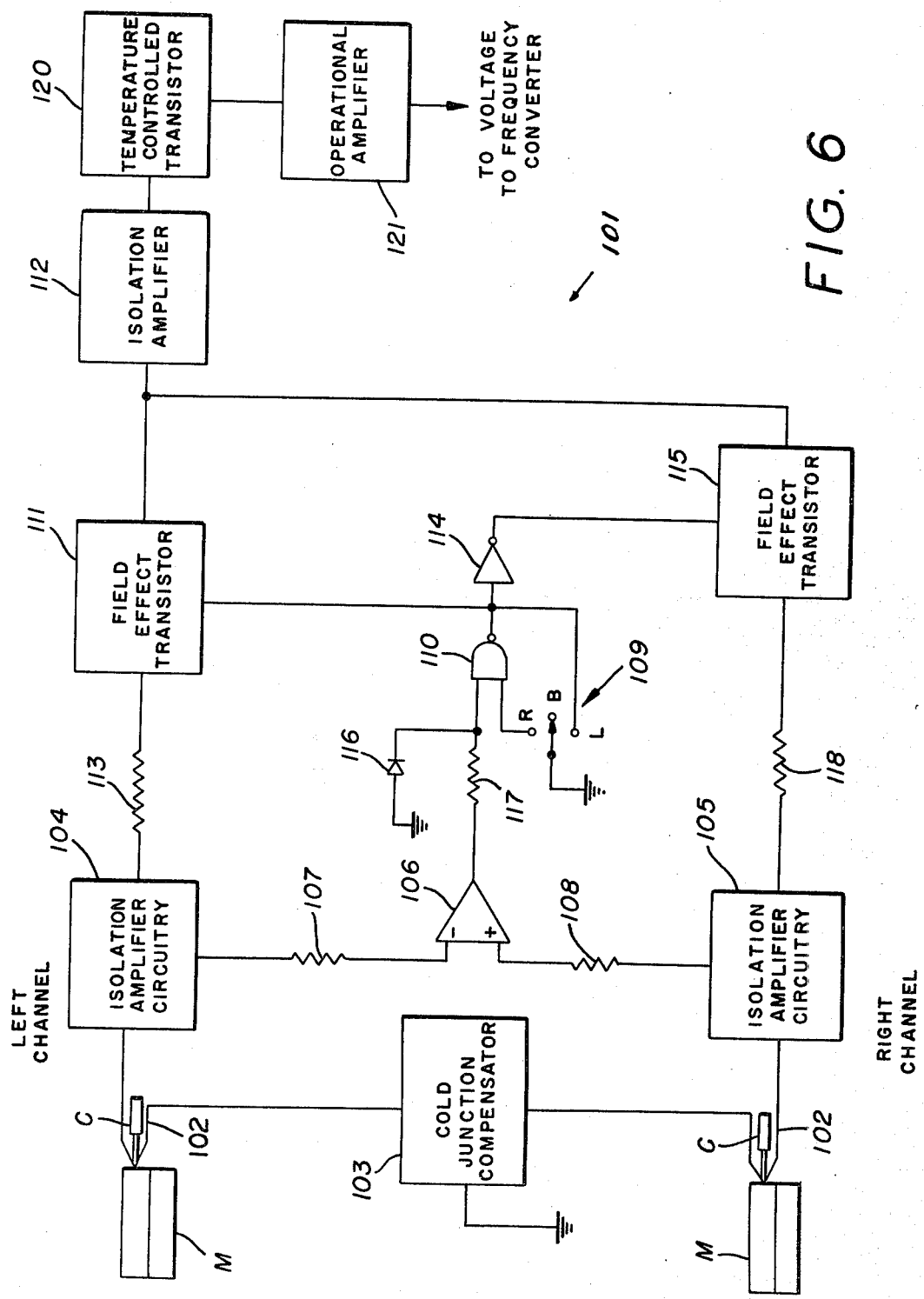
FIG. 6 is a block-schematic diagram of a low temperature detector and function generator shown in block form in FIG. 1.
Figure 7:
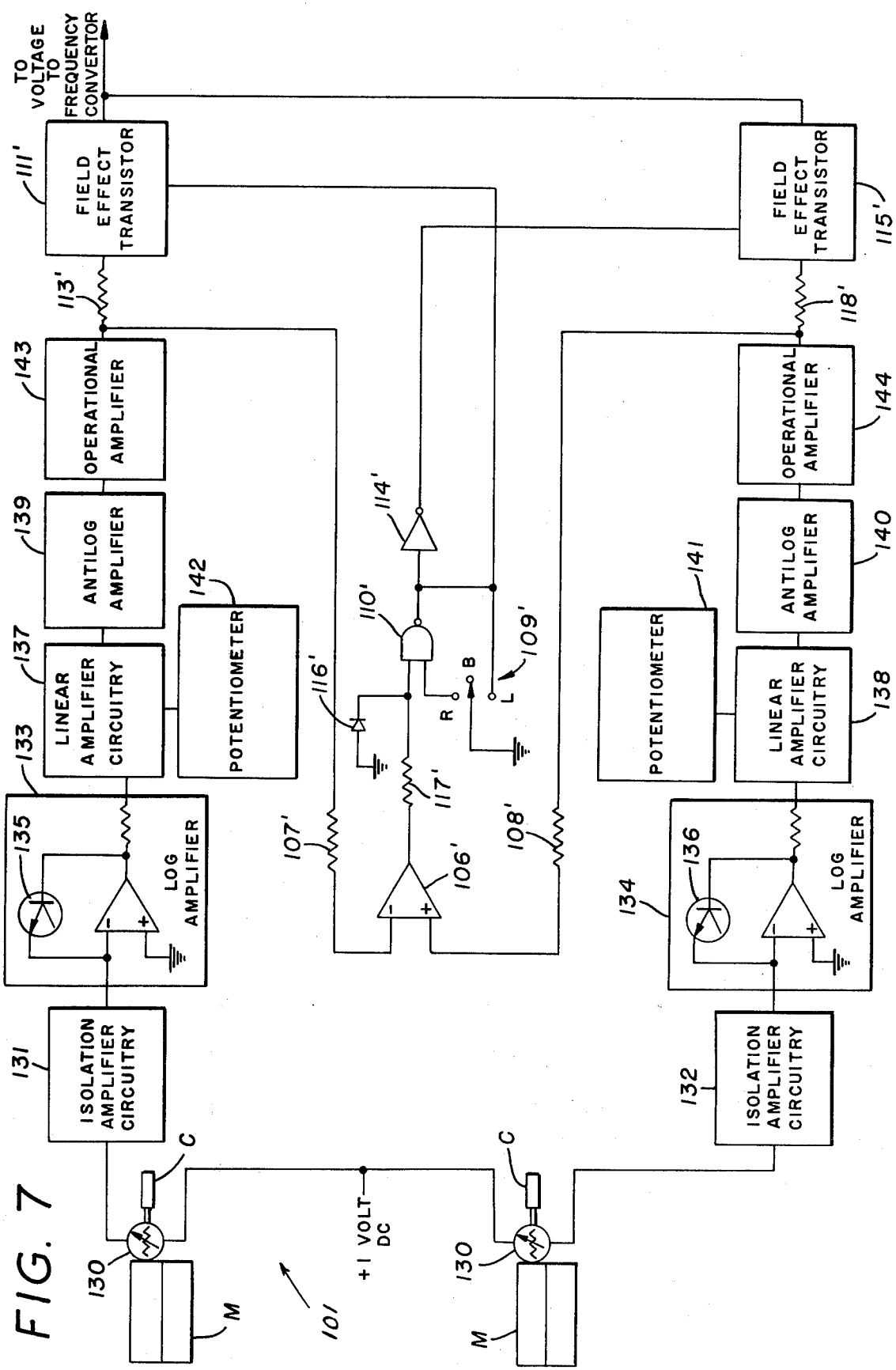
FIG. 7 depicts an alternative embodiment to the circuitry of FIG. 5 including the means to generate the Arrhenius Function.

A cure equivalent generating circuit is indicated generally by the numeral 100 in FIG. 1 and is shown as receiving its activation from a low temperature detector and function generator circuitry 101, two alternate forms of which are shown in FIGS. 6 and 7.

As previously briefly described, most present day passenger tire vulcanizing presses are of the "twin" type, that is, they cure two tires at the same time with simultaneous opening and closing of the two molds, both being carried by a single press head. The two tires generally will have somewhat different time-temperature profiles during the cure; thus, their respective cure rates will be inherently different. When operating in the real time mode, these rate differences are ignored since both tires are subjected to the same cure time cycle. Since undercuring is more detrimental than overcuring, the combined cure should be determined by the tire which is curing at the lower rate. To this end, when operating in the cure equivalent mode on a twin press, the circuitry 101 of both FIGS. 6 and 7 is designed to utilize only the lower of the two tire temperatures, thereby eliminating any possible undercuring.

In the FIG. 6 embodiment, circuitry is described which provides an output signal proportional to $R_1$ in equation (3). A conventional thermocouple probe 102 is placed in each tire within the mold M'to obtain the actual internal temperature of the tire ($T_1$ in equations (1), (2) and (3)). Each probe 102 is carried by the piston rod of an air cylinder C which, shortly after the press closes, is activated to insert the probe 102 through a small insulated hole in the mold and on directly into the tire. When the cure is ended and just before the mold opens, the cylinder C is deactivated withdrawing the probe.

Since standard thermocouples 102 will transmit a signal proportional to the difference between the room temperature and the internal temperature of the tire, a conventional cold junction compensation circuit 103 must be utilized to account for room temperature. Thus a signal proportional to $T_1$ in equations (1) and (2) is provided from each tire to standard isolation amplifiers 104 and 105, respectively, which act to magnify the small voltage output of thermocouples 102 into a usable range.

The signals from amplifiers 104 and 105 are fed to an analog comparator 106, a standard operational amplifier, with the signal from amplifier 104 being fed to the inverting input (−) of comparator 106 and the signal from amplifier 105 being fed to the non-inverting input (+) of comparator 106 through appropriate dropping resistors 107 and 108, respectively.

A higher voltage on the non-inverting input of comparator 106, indicative of a higher internal tire temperature, causes the output voltage of comparator 106 to go to a positive saturation voltage, for example, 15 volts. With the switch 109 (to be hereinafter described) in the "B" position, indicative of the fact that a tire is being cured in each mold of the twin press, a NAND gate 110 acts merely as an inverter and thus puts out a low logic or ground signal to an analog switch which can be a conventional P channel field effect transistor (FET) 111. The low logic signal closes FET 111, which acts like a switch, and imposes the signal from amplifier 104, (being the lower of the two temperature signals) to isolation amplifier 112, through an appropriate dropping resistor 113. Contemporaneous with this activity, the low logic signal from NAND gate 110 is inverted by logic inverter 114 which imposes a high logic signal (15 volts) onto a second P channel FET 115, the high signal maintaining FET 115 open.

If, however, the higher voltage appears on the inverting input of comparator 106, the output of comparator 106 is negative with a diode 116 limiting the excursion of the negative output through dropping resistor 117 to avoid short circuiting the comparator 106 and to maintain electrical compatability with NAND gate 110. The NAND gate 110 converts this low logic signal to a high signal, opening FET 111 and closing FET 115, through inverter 114, to impose the signal from amplifier 105 (now being the lower of the two temperature signals) on isolation amplifier 112 through an appropriate dropping resistor 118. The net result is, of course, that the lower temperature, indicative of the slower curing tire, is fed to amplifier 112, thus assuring that a tire in a twin press will not be undercured.

In the event that one of the molds in a twin press is not being utilized to cure a tire, the switch 109 can be set to close the proper FET 111 or 115. If only the left hand side of the twin press is curing a tire, thus activating amplifier 104, switch 109 can be placed at the "L" position imposing an automatic ground on FET 111 and thereby bypassing the comparator 106 and its associated elements. Similarly, FET 115 is closed by moving switch 109 to the "R" position.

The signal proportional to temperature, whether it be directly from a single mold press or the lowest temperature from a twin press, is fed to a conventional antilog amplifier which includes a temperature controlled transistor 120, such as that sold by Fairchild Semiconductor, Mountain View, California, Model No. U5U7726323 used to convert the temperature signal into one which is the exponential of temperature. The current output of transistor 120 is converted to a voltage output proportional to the approximated $R_1$ (equation (3)) by a conventional operational amplifier 121.

In the FIG. 7 embodiment of the low temperature detector and function generator inputs 101 to the cure equivalent circuitry 100, a signal proportional to the precise curing rate, as defined by equation (2) is generated. In this embodiment, a probe 130 which in its simplest form could be a diode but which is shown as a thermistor replaces the thermocouple probe 102 of the FIG. 6 embodiment. A thermistor is a nonlinear temperature sensitive resistor having the following characteristics:

$$\frac{r_1}{r_0} = e^{\beta(\frac{1}{T_1} - \frac{1}{T_0})} \quad (4)$$

where $r_1$ equals thermistor resistance at absolute temperature $T_1$; $r_0$ equals thermistor resistance at absolute temperature $T_0$; and $\beta$ equals the temperature independent thermistor material constant. With a constant voltage V supplied to a thermistor, the current at temperature $T_1$, $I_1$, equals $V/r_1$ and the current at temperature $T_0$, $I_0$, equals $V/r_0$. Thus, the thermistor current ratio is as follows:

$$\frac{I_1}{I_0} = \frac{r_0}{r_1} = e^{\beta(\frac{1}{T_0} - \frac{1}{T_1})} \quad (5)$$

or $$I_1 = e^{\beta(\frac{1}{T_0} - \frac{1}{T_1})} (I_0) \quad (6)$$

The similarity between equation (6) and equation (2) is evident with the only variances being the constants $\beta$ and $\alpha$.

The valve of $\beta$ for commercially available thermistors is in the range of 4000° K to 6000° K while $\alpha$ in equation (2) for vulcanization reactions is in the range of 10000° K or more. Therefore, with the thermistor probe 130 and with amplification of the particular $\beta$ to coincide with the particular $\alpha$, a signal is generated which is identical to the exact Arrhenius function. The circuitry of FIG. 7 performs this function.

Each thermistor probe 130 inserted into mold M by cylinder C, as previously described, provides a signal proportional to $I_1$ in equations (5) and (6), conventional isolation amplifiers 131 and 132, similar to amplifiers 104 and 105 of FIG. 6, which can be utilized to adjust for minute, but inevitable differences between characteristics of various thermistors so that when the temperature in the two tires in a twin press is the same, the outputs of amplifiers 131 and 132 are the same. These signals are presented to logarithmic amplifiers 133 and 134, respectively, which include in their feedback loops, conventional temperature controlled transistors 135 and 136, respectively, which can be identical to transistor 120. The outputs of amplifiers 133 and 134 are thus the logarithm of the input, that is, linear with $\beta$ of equation (6).

The signals proportional to $\beta$ are fed to linear amplifiers 137 and 138 which are utilized to correct $\beta$ of equation (6) so that it coincides with $\alpha$ of equation (2) for rubber. The outputs of amplifiers 137 and 138 are presented to antilog amplifiers 139 and 140, respectively, which can be another device identical to transistor 120, which returns the function to its exponential form. An offset adjustment via biasing potentiometers 141 and 142 is necessary in amplifiers 137 and 138 to maintain the signal within the limits of the antilog amplifiers 139 and 140. The current output of amplifiers 139 and 140 is then converted to a voltage proportional to I in equation (6) by operational amplifiers 143 and 144, respectively. The gain of amplifiers 143 and 144 can be adjusted to place the signal in the usable range for the cure equivalent generating circuitry 100 to be hereinafter described.

The signals from amplifiers 143 and 144 are fed to circuitry, identical to that described in conjunction with the FIG. 6 embodiment, which selects the lowest of the two readings when two tires are being cured in a twin press. This circuitry includes comparator 106', dropping resistors 107' and 108', mold selection switch 109', NAND gate 110', FET's 111' and 115', dropping resistors 113' and 118', inverter 114', diode 116' and dropping resistor 117', all of which function as previously described.

Whether utilizing the thermocouple or thermistor function generator 101, the signal proportional to $R_1$ is fed to a voltage to frequency converter circuitry 150 of cure equivalent generating circuitry 100, shown in FIG. 1. Voltage to frequency converter circuitry 150 is a conventional application of integration circuitry such as described in Fairchild Semiconductor Application Brief No. 144 dated February, 1970, whose output is a pulse train having a frequency proportional to cure equivalents per minute, that is, $R_1$. Because it is more accurate to integrate over a short time period, an accurate voltage to frequency conversion, of necessity, produces a signal of a higher than desirable frequency. The frequency of this signal must therefore be divided to put it into the range necessary for the satisfactory operation of circuitry to be hereinafter described. To this end, a ripple counter frequency divider 151 is provided which is similar to the dividers 15, 16, 17 and 18 previously described.

The voltage to frequency converter 150 and frequency divider 151 should be together calibrated so that when the probe 102 or 130 reads a 300° F tire temperature, the frequency of the signal is one pulse every tenth of a minute, thus conforming to the definition of one tenth of a cure equivalent. For example, assuming that the integrate rate within the voltage to frequency converter 150 is forty cycles per second at 300° F, then a frequency divider 151 having a division rate of 240 would be necessary.

Figure 5:
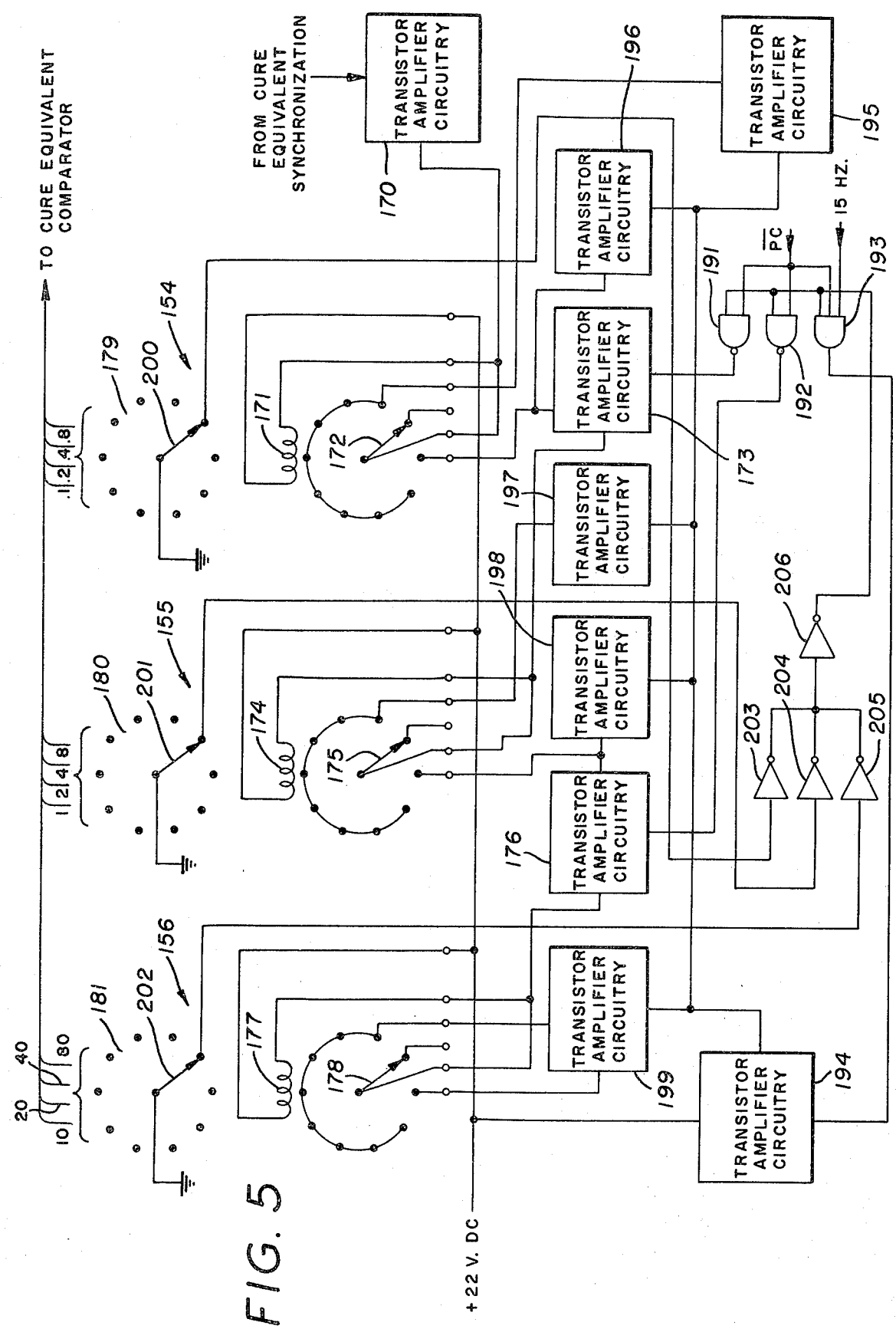
FIG. 5 is a block-schematic diagram of a portion of the circuitry shown in FIG. 1 directed toward the operation in the cure equivalent mode.

The signal from frequency divider 151 is provided to a cure equivalent synchronization circuit 152, shown in detail in FIG. 8, to be hereinafter described, and then sent to the cure equivalent readout counter system 153 consisting of a tenths decade counter 154, units decade counter 155 and a tens decade counter 156. As best shown in FIG. 5, counter system 153 is identical to the counters 19 and 20 except that an extra counter 156 is provided to display up to 99.9 cure equivalents. Like counters 19 and 20, counter decades 154, 155, and 156 generate a BCD coded electrical readout to a cure equivalent comparator 157 which like comparator 12 detects a match between actual cure equivalents from counter system 153 and the information punched in row twelve of the input program means. When such a match is detected, dependent on the mode selected, the curing procedure will end, as will be hereinafter described. Further, the frequency divider 151 will be reset in a conventional manner.

The synchronization circuit 152 is designed to perform two general functions; first, to provide a pulse of proper length to the coils of counter system 153; and second, to "blank" the cure equivalent comparator 157 during stepping intervals. This latter feature may be necessary in that standard comparators 157 are sensitive to receiving false BCD information during the short step interval of the counter system 153. Although there would be numerous manners in which to perform these functions, as would be known to one skilled in the art, the pulse at 15 cps coming from division-by-two-bank 18 is available for this purpose, in the following manner.

Figure 8:
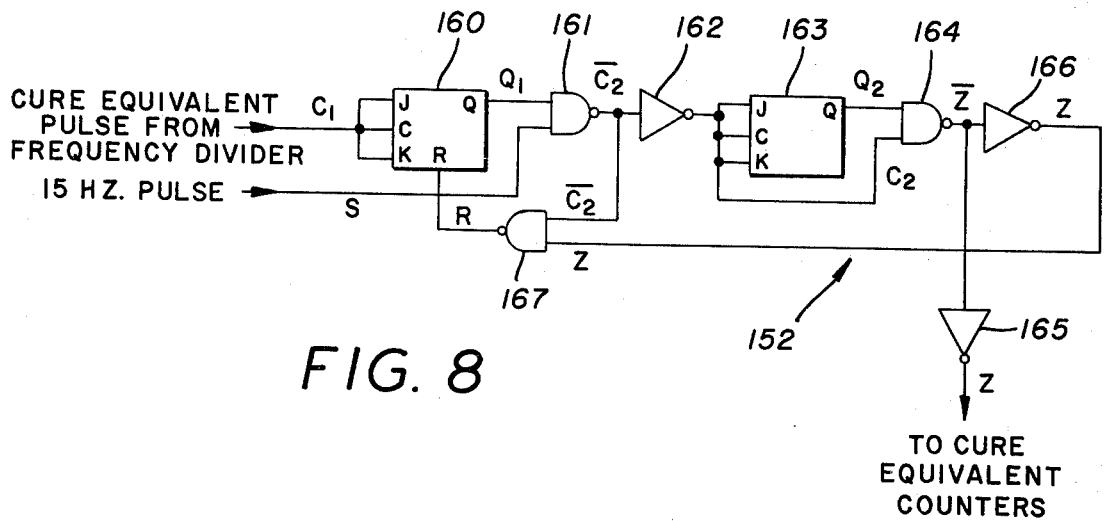
FIG. 8 is a schematic diagram of a typical cure equivalent synchronization circuit shown in block form in FIG. 1.

As shown in FIG. 8, as each random pulse of short duration from the frequency divider 151, indicated as $C_1$, goes negative, a flip-flop 160 is set so that a permissive signal, designated $Q_1$, goes high. A NAND gate 161 receives the $Q_1$ signal and the 15 hz. synchronizing signal from division-by-two bank 18, indicated as S in FIG. 8, such that during the next S signal after a $C_1$ signal the output of NAND gate 161, designated $\overline{C_2}$ (not $C_2$) goes low. An inverter 162 acts on the $\overline{C_2}$ to provide a $C_2$ signal which, as it goes negative, will set a second flip flop 163. $C_2$, of course, will not go negative and therefore not set flip flop 163 until S goes down. At such an occurrence, $Q_2$ goes high and forms one input to NAND gate 164. The other input to NAND gate 164 is the $C_2$ signal which at the present instant in time under discussion is low and therefore inhibits NAND gate 164. $C_2$, however, will go up on the next S pulse allowing NAND gate 164 to generate a low signal, designated $\overline{Z}$. An inverter 165 converts $\overline{Z}$ to Z to charge the coil 171 of the stepping counter 154 in a manner similar to that previously described in conjunction with counter 19 and to be hereinafter described in detail. This signal is of a proper duration, such as thirty-three milliseconds, so as to provide the counter 154 with an energy pulse suitable for reliable operation.

The $\overline{Z}$ signal is also provided to inverter 166 to cause the Z signal to be imposed onto NAND gate 167 along with the $\overline{C_2}$ previously described. Remembering that the Z signal goes high after the $\overline{C_2}$ signal goes low, the output of NAND gate 167, R, will remain up until S goes down. At this point in time, an R pulse of very short duration (corresponding to the inherent propagation delays involved in the operation of the NAND gates and inverters) will reset flip flop 160 removing the $Q_1$ signal until another pulse $C_1$ is generated from the frequency divider 151. At this same time, the $\overline{Z}$ signal will go up removing the charge from the coil 171 of counter 154 and thereby allowing it to step.

As shown in FIG. 5, the $\overline{Z}$ signal from the cure equivalent synchronization circuit 152 energizes transistor amplifier system 170 which successively energizes and de-energizes the stepping coil 171 of counter 154 thereafter causing its indicator 172 to advance one step. When indicator 172 reaches the ninth step, the next pulse to transistor system 170 completes the circuit to counter 155 through transistor amplifier circuitry 173 to energize stepping coil 174 of counter 155 thereafter causing its indicator 175 to advance one step. Similarly, when indicator 175 reaches the ninth step, the next pulse to transistor system 170 further completes the circuit to counter 156 through transistor amplifier circuitry 176 to energize stepping coil 177 of counter 156 causing its indicator 178 to thereafter advance one step. As this action continues, the BCD coded numbers are transmitted from the upper decks 179, 180 and 181 of counters 154, 155 and 156, respectively, to the cure equivalent comparator 157.

Also shown in FIG. 5 is the cure equivalent reset circuitry indicated generally by the numeral 190 and being somewhat similar to the time generator reset circuitry 35. A signal from the press indicating that it has started to open completes the inputs to NAND gates 191 and 192 to de-energize transistors 173 and 176, respectively, by grounding the base circuit thereof. This signal also completes the inputs to a three input AND gate 193 allowing the fifteen hz. pulse from frequency divider bank 18, previously described, to trigger the base of transistor amplifier circuit 194 which drives transistor amplifiers 195, 196, 197, 198 and 199 at the fifteen cycle reset rate. Since transistors 173 and 176 have been de-energized, the indicators 172, 175 and 178 step toward zero independently until the zero position is reached.

The indicators 200, 201 and 202 of upper decks 179, 180 and 181, respectively, are shown in the zero position in FIG. 5, the reset stepping having been completed. At this time, a ground or low logic signal is fed to three inverters 203, 204 and 205, respectively, and the resultant signal being inverted again by digital invertor 206 and fed to AND gate 193 and NAND gates 191 and 192, to now inhibit these gates, it being this signal which had completed the inputs to these gates.

Having now described two basic modes (time and cure equivalents) in which the apparatus 10 is capable of operating, the manner in which these modes are selected should be described in detail. This is accomplished through the mode selection logic circuitry 29 shown in detail in FIG. 9. As previously described, circuitry 29 is a system of logic elements directed by the input program means to operate either in a time mode, a cure equivalent mode, or a combination of the two modes. Numerous and varying such logic systems could be devised by one skilled in the art, that shown in FIG. 9 being representative of one such system.

There are five inputs to the mode selection circuitry 29, an ST signal coming from the last column of the row of the step being controlled by the punch card shown in FIG. 2; the $S_1$ and $S_2$ signals coming from the twelfth and thirteenth columns of row twelve of the punch card; a signal from time comparator 12; and a signal from cure equivalent comparator 157. A hole punched in the punch card at the indicated locations causes $S_1$, $S_2$ and ST, respectively, to be at a low logic level while no hole indicates a high logic level. The major output of the circuitry 29 is that signal which steps the counter 30.

It is possible to select four combinations of modes by which the cure functions may be dictated. First, each step may be measured by time alone; second, the termination of the cure or a selected step can be governed by elapsed cure equivalents alone; third, the cure may be controlled by elapsed time or cure equivalents, whichever comes first; and fourth, the cure or a step may be terminated only when both time and cure equivalent parameters are satisfied. Since there are four possible "hole" or "no hole" combinations of $S_1$, and $S_2$ as shown in FIG. 2, it is that portion of the punch card which dictates the mode selected. Also, a hole is punched in the twenty-second column in the particular step or steps in which it is desirable that a cure equivalent match be read, as will hereinafter be evident. While as previously described column twenty-two is also utilized for certain aspects of the delay cure feature, the cure equivalent mode will override any activity of that feature.

The primary components of circuitry 29 are four NAND gates 71, 72, 73 and 74 and an inverter 79. The first of these NAND gates to be energized provides the signal to the step counter 30. NAND gate 71 will be energized upon a signal from time comparator 12 and a high ST signal (no hole in column 22 indicating that no cure equivalent control is desired in the particular step). Thus, NAND gate 71 through inverter 79 dictates operation in a pure time mode, no matter what is punched in $S_1$ and $S_2$.

The inputs to NAND gate 72 are the signal from time comparator 12, an inverted ST signal (having passed through inverter 75) and a signal from $S_2$. Thus, if there is a hole in column twenty-two of the particular step being performed and no hole in $S_2$, a pure time mode will again be dictated. This time, however, a delay cure feature is being commanded.

The inputs to NAND gate 73 consist again of the signal from time comparator 12, the inverted ST signal, and the signal from cure equivalent comparator 157. Thus, this gate will be energized only on the occurrence of both a match in time and in cure equivalents.

NAND gate 74 receives the match signal from cure equivalent comparator 157, the inverted ST signal, and the $S_1$ signal, the latter having been inverted by inverter 76. Thus, when there is a hole in $S_1$ and a hole in column twenty-two, a signal from comparator 157 will energize the step counter through NAND gate 74 and inverter 79.

In summary, it is the logic condition of $S_1$ and $S_2$ and the combinations thereof which dictate the mode assuming down ST signals. If neither $S_1$ and $S_2$ are punched, NAND gate 72 controls upon a signal from comparator 12, NAND gates 71 and 74 being inhibited and NAND gate 73 needing a signal from both comparator 12 and comparator 157. If both $S_1$ and $S_2$ are punched, NAND gate 74 controls upon a signal from comparator 157, NAND gates 71 and 72 being inhibited and NAND gate 73 needing a signal from both comparator 12 and comparator 157. If $S_1$ is not punched and $S_2$ punched, NAND gates 72 and 74 control the output, NAND gate 71 being inhibited and again NAND gate 73 needing a signal from both comparators 12 and 157. Thus, in this instance either a time or a cure equivalent match will step counter 30, whichever comes first. If $S_1$ is punched and $S_2$ not punched, NAND gate 73 controls with NAND gates 71, 72 and 74 being inhibited. Thus, both the time and the cure equivalent factors must be satisfied. If no hole is punched in column twenty-two, all gates but NAND gate 71 are inhibited and a pure time mode is demanded.

If operating in a cure equivalent mode alone, that is, with holes in $S_1$, $S_2$ and column twenty-two of the particular step, there would be no necessity for utilizing the step extend feature and therefore, through inverter 77 and NAND gate 78, a pulse which resets flip-flop 54 is generated.

No matter which mode, when the output of the mode selection circuitry 29 steps counter 30, a new output function or/a terminating of the cure is demanded. These output functions are punched into, and therefore commanded by, the logic signals from the columns labelled $F_1$, through $F_{12}$, inclusive, in the card of FIG. 2. All or any output functions may be commanded in any one particular step, these output functions being, in the tire vulcanization process, pneumatically or electrically controlled devices such as steam supply valves and the like.

The output logic signals from the punch card reader 11 are suitably amplified as by output amplifiers 80 to drive interfacing devices 81 such as triac switches, SCR'S, relays and the like.

From the foregoing it should be evident that a tire cure programmer and function generator constructed according to the concepts of the invention described herein, will allow a universality of control of a manufacturing process, such as the vulcanization of tires, and substantially improve the machine control and other arts.

I claim:

1. A method for controlling the steps in the curing of a rubber compound in a mold, the rate of cure being governed by the Arrhenius equation, comprising the steps of closing the mold with the rubber compound therein, heating the mold to initiate the cure, introducing a probe whose electrical resistance varies with temperature into the rubber compound, sensing the rate of cure of the rubber compound directly by the probe by placing a constant voltage across the probe to generate a current signal related to the Arrhenius equation and by adjusting said current signal to produce a current signal directly proportional to the rate of cure, controlling and sequencing the steps in the curing process as a function of time, at the same time calculating the state of cure from the sensed rate of cure, and terminating the cure and opening the mold at a desired state of cure regardless of the condition of the cure as a function of time.

2. A method according to claim 1 wherein the probe is introduced through the mold and into the rubber compound.

3. A method according to claim 2 wherein the probe is introduced after the mold is closed and after the heating is initiated.

4. A method for controlling the heating steps in the curing of a rubber compound in a mold, the rate of cure being governed by the Arrhenius equation, comprising the steps of closing the mold with the rubber compound therein, heating the mold to initiate the cure, introducing a probe whose electrical resistance varies with temperature into the rubber compound, sensing the rate of cure of the rubber compound directly by the probe by placing a constant voltage across the probe to generate a current signal related to the Arrhenius equation and by adjusting said current signal to produce a current signal directly proportional to the rate of cure, calculating the state of cure from the sensed rate of cure, controlling and sequencing the steps in the curing process as a function of the state of cure, and terminating the heat supply at a predetermined total state of cure.

5. A method of controlling the steps in the curing of a rubber compound in a mold, the rate of cure being governed by the Arrhenius equation, comprising the steps of closing the mold with the rubber compound therein, heating the mold to cure the rubber compound, introducing a probe whose electrical resistance varies with temperature into the rubber compound, sensing the rate of cure of the rubber compound directly by the probe by placing a constant voltage across the probe to generate a current signal related to the Arrhenius equation and by adjusting said current signal to produce a current signal directly proportional to the rate of cure, calculating the state of cure from the sensed rate of cure, controlling and sequencing the steps in the curing process selectively from the state of cure and as a function of time, and terminating the cure selectively at a predetermined state of cure and time.

6. A method according to claim 5 wherein the cure is terminated only when both the predetermined state of cure and predetermined time are determined.

7. A method according to claim 5 wherein the cure is terminated at the predetermined state of cure and time, whichever occurs first.

* * * * *